3,817,904
LOW TEMPERATURE RESILIENT COMPOSITION HAVING SEALANT AND CAULKING UTILITIES
Duane W. Gagle and Homer L. Draper, Bartlesville, Okla., assignors to Phillips Petroleum Company
No Drawing. Filed Dec. 1, 1972, Ser. No. 311,381
Int. Cl. C08c 11/16, 11/22; C08f 19/08
U.S. Cl. 260—33.6 AQ
2 Claims

ABSTRACT OF THE DISCLOSURE

Composition comprises essentially (a) an amorphous polypropylene, as can be obtained in production of crystalline polypropylene, which can contain up to about 5 percent ethylene in the polymer, the polymer being soluble in low boiling saturated hydrocarbons having up to about five carbon atoms in the molecule; (b) a rubber block copolymer of butadiene-styrene in approximate ratios of from 60:40 to 80:20, respectively in solution in aromatic extender oil containing approximately 40–65 percent weight of the rubber copolymer; (c) asbestos fibers, preferably shorts, in following approximate weight percent proportions: amorphous polypropylene, 25–40; rubber/oil blend, 45–25; asbestos fibers, 30–35; the composition being applied usually by adjusting to required consistency with hydrocarbon solvent, e.g. Stoddard solvent, say 5–10 weight percent of solvent added to composition for caulking and say 10–20 weight percent added for spray application as sealant. The applied composition retains resiliency and adhesion over a wide range of temperature e.g. —40 to 140° F. and is useful to seal against moisture, etc., cement surfaces, asphalt-concretes, cracks, joints, leaks and to render them resistent to chemical attacks.

---

This invention relates to a composition suitable for use as sealant and for caulking.

In one of its aspects, the invention relates to a composition based upon amorphous polypropylene having excellent sealing and caulking properties over a wide range of temperatures, e.g. —40 to 140° F. Further, the invention provides a composition which can be extended with a suitable solvent, e.g. Stoddard solvent, and readily applied as with a trowel, a caulking gun, a spray device or otherwise as may be desired.

In one of its concepts, the invention provides a composition comprising a non-crystalline, i.e., amorphous, hydrocarbon polymer obtained from propylene and which can contain up to about 5 percent ethylene in the polymer, the polymer being soluble in low boiling saturated hydrocarbons having up to about 5 carbon atoms in the molecule; a rubber block copolymer of butadienestyrene in approximate ratios of from 60:40 to 80:20, respectively, in solution in an aromatic extender oil usually used in the art to extend such rubbers, the oil containing approximately 40–65 weight percent of the rubber copolymer; asbestos fibers, preferably short, in approximate weight proportions as follows: amorphous polypropylene, 25–40; rubber/oil blend, 45–25; asbestos fibers, 30–35; the composition being applied upon adjusting to required consistency for the particular desired application with hydrocarbon solvent, e.g. Stoddard solvent, say 5–10 weight percent of solvent added to the composition for caulking utility and say 10–20 weight percent for spray application as sealant.

The amorphous polypropylene which is particularly suited to formulation of the composition of the invention has a molecular weight of about 7,000 to 10,000 as determined by intrinsic viscosity measurement. It is obtained as a byproduct in the production of crystalline polypropylene by several well-known catalytic methods such as described in U.S. 2,794,842 (Hogan and Banks, 1957) and U.S. 2,845,414 (Schutze, 1958), among others, and is a tacky to semi-tacky, normally white solid soluble in hydrocarbon solvents. It is commercially available.

The rubber now preferred is prepared from butadiene and styrene, is a block copolymer and is prepared by methods now known in the art, and is preferably present in a proportion of 70:30 to 75:25 butadiene and styrene, respectively. These are usually prepared using an organolithium initiator and a monomer mixture dissolved in a hydrocarbon solvent as described in British Pat. 888,624 (published January 1962). The block copolymers contain between 15 and 25 percent polystyrene blocks.

The asbestos fibers or shorts can be from any source. Importantly, long fibers are presently not preferred and should be avoided because they may mat down and do not blend very well. Of course, depending upon the method of blending, the fibers used can have various lengths. Presently preferred are the asbestos fibers or shorts as available from Johns-Manville under the designation 7M–02 and which have the following Rotap Screen Analysis (100 grams—30 minutes):

|  | Percent |
|---|---|
| plus 6 mesh | 0 |
| plus 14 mesh | 0 |
| plus 20 mesh | 4 |
| plus 28 mesh | 43 |
| plus 35 mesh | 25 |
| plus 65 mesh | 9 |
| minus 65 mesh | 19 |

The Wet Classification Bauer McNett test of this material is plus 14 mesh (percent) 1 and minus 200 mesh 81. The Penetration Efficiency (percent) 170 and Color 61.

The foregoing data are taken from the Johns-Manville Asbestos Fiber Division Data Sheet AF–38A 7–67.

The three principal ingredients are combined within the approximate limits as follows:

|  | Wt. percent |
|---|---|
| Amorphous polypropylene | 25–40 |
| Asbestos fibers | 30–35 |
| Rubber/oil blend | 40–25 |

The compositions described herein, especially as made up with solvent in amount required for proper application, are useful with good resiliency and adhesion over a wide range of temperatures to seal against moisture, etc., cement or concrete surfaces, ashphalt-concrete, cracks, joints, leaks and to render these resistant to chemical attacks.

It is an object of this invention to provide a sealant composition. It is another object of this invention to provide a caulking composition. It is a further object of this invention to provide a sealant/caulking composition which is possessed of good resiliency and good adhesion over a wide range of temperatures, especially temperatures of the order of about —40° F. and of the order of about 140° F. It is a further object of this invention to provide a composition as described which is resistant to attack by chemicals such as acids and bases. It is a still further object of the invention to provide a composition which will protect the surfaces against spalling caused by water accumulation and freezing.

Other aspects, concepts, objects, and the several advantages of the invention are apparent from a study of this disclosure and the appended claims.

According to the present invention, a composition suitable for uses as herein stated and related uses is composed essentially of an amorphous polypropylene, a rubber/oil blend, the rubber being a block copolymer of butadienestyrene and being extended in an aromatic extender oil commonly used in industry to extend such rubber, polymers, and asbestos fibers, preferably asbestos shorts.

Still according to the invention, the composition will contain amorphous polypropylene, which can contain up to about 5 percent of ethylene in the polymer, in a weight percent approximate range of 25–40; asbestos fibers shorts in an approximate weight range of 30–35 approximately, and about 45–25 weight percent of the rubber-aromatic oil blend together with sufficient Stoddard solvent to provide the required working consistency for the particular application. Other solvents which may be used are normally liquid hydrocarbons containing 4–8 carbon atoms, such as butane, hexane, cyclohexane, octane, iso-octane or mixtures thereof.

In the following tabulation, data are given for varying proportions of different combinations. The first two compositions are not according to the invention and the last composition is according to the invention. Examination of the data indicates utility over a large temperature range of about —40° F. to about 140° F. when caulking or sealing as described herein.

In the examples, the amorphous polypropylene was obtained as a by-product from the production of crystalline polypropylene and had a molecular weight of about 10,000. The rubbery copolymer of butadiene-styrene was made using n-butyllithium initiator and a 75/25 ratio butadiene-styrene feed dissolved in a hydrocarbon solvent. The polymer had 18% block polystyrene and a final Mooney ML–4 of 47 (ASTM D1646–61T). The extender oil is an aromatic oil meeting the following specifications: About 75% aromatic hydrocarbons; API gravity 10–14, specific gravity 0.97–1.0, viscosity SUS at 100° F.=6500–7500, at 210° F.=75–175, and having a maximum percent volatility at 225° F. for 22 hours and 325° F. for 3 hours.

The above ingredients of the composition of this invention can be admixed in any desired order or combinations at room temperature or at a temperature preferably not exceeding 150° F. in a stirred vessel.

In the example above, all the ingredients were placed in a stirred, open vessel simultaneously and agitated at about 100° F. until smoothly blended. The resultant mixture was a viscous liquid at room temperature which flowed quite freely at 100° F.

Open-graded asphaltic aggregate mix also known as popcorn mix is often specified for airfields and selected areas of highways where anti-skid surfaces are desired. A rough textured surfaces is thus obtained. However, an important problem encountered is the loss of aggregate caused by stripping, traffic abrasion and by penetration of moisture causing freezing and spalling. The composition of the invention provides a sealant or bonding agent which will keep water from entering the voids in the surface, thus preventing loss of aggregate at or under wide temperature variation conditions.

Reasonable variation and modification are possible within the scope of the foregoing disclosure and the appended claims to the invention the essence of which is that there has been provided, as described, a composition suitable as sealant and as caulking material, the composition consisting essentially of an amorphous polypropylene, a synthetic rubber block copolymer of butadiene-styrene in an aromatic extender oil and asbestos fibers, in approximate proportions and applied also as described.

| | Composition | Condition at 0–40° F. | Condition at +110° F. | Condition at 140° F. |
| --- | --- | --- | --- | --- |
| Not according to the invention. | A. 60 wt. percent amorphous PP, 30 wt. percent asbestos fiber, 10 wt. percent Stoddard solvent. | Firmly joined blocks, separated by shock—retained resilience (−40° F.) | Good cohesion at 110—well bonded, soft but still a sealant. | Fairly liquid—nonbonding and non-sealing—too much cold flow. |
| Do | B. 60 wt. percent Solprene ® 1205/oil, 30 wt. percent abestos fiber, 10 wt. percent Stoddard solvent. | Bonding fair—(−40° F.) | Dry-nonbonding | Fail. |
| According to the invention. | C. 30 wt. percent amorphous PP, 30 wt. percent Solprene 1205/oil (50 wt. percent copolymer—50 wt. percent extender oil), 30 wt. percent abestos fibers, 10 wt. percent. Stoddard solvent. | −20° F—blocks firmly joined, 0° F.—slight tack still noted-blocks firmly joined. | Slight softening from the 77° but less soft than A—more cohesion. | Soft—good cohesion as blend A at 110° F. |

® Registered Trademark of Phillips Petroleum Company.

The asbestos filler is added to the other ingredients of the composition by simple mixing in a blender, and the mixing can be carried out in the presence of some or all of the solvent to be used for the desired application.

EXAMPLE

An open-graded asphaltic aggregate mix was prepared from crushed rock aggregate having the following characteristics:

| Sieve size, inch: | Wt. percent passing |
| --- | --- |
| 3/8 | 100 |
| 4 | 25–65 |
| 8 | 15–25 |
| 16 | 0–15 |
| 200 | 0–3 |

The aggregate was mixed in a pug mill at an elevated temperature of about 275–300° F. with a standard asphalt cement, 60–70 penetration, so that the final aggregate mix had an asphaltic content of 7 wt. percent. After laying and smoothing, a sealing coat of the following composition was applied:

| | Wt. percent |
| --- | --- |
| Amorphorus polypropylene | 30 |
| Rubber/oil blend 50% of 75/25 block copolymer butadiene/styrene (Solprene® 1205, Phillips) | 30 |
| Johns-Manville asbestos shorts 7M-02 | 30 |
| Stoddard solvent | 10 |

We claim:
1. A composition suitable for use in sealing or caulking which comprises essentially (a) an amorphous polypropylene, as can be obtained in production of crystalline polypropylene, which can contain up to about 5 percent ethylene in the polymer, the polymer being soluble in low boiling saturated hydrocarbons having up to about five carbon atoms in the molecule; (b) a rubber block copolymer of butadiene-styrene in approximate monomer ratios of from 60:40 to 80:20, respectively, in solution in aromatic extender oil containing approximately 40–65 percent weight of the rubber copolymer; (c) asbestos fibers in following approximate weight percent proportions: amorphous polypropylene, 25–40; rubber/oil blend, 45–25; asbestos fibers, 30–35.

2. A composition according to claim 1 wherein the amorphous polypropylene has a molecular weight in the approximate range of from about 7,000 to about 10,000; the rubber has butadiene-styrene in the ratio of about 70:30 to about 75:25; the rubber block copolymer aromatic extender oil solution contains approximately 40–65 weight percent of rubber and wherein the ingredients are combined in proportions approximately as follow:

| | Wt. percent |
| --- | --- |
| Amorphorus polypropylene | 25–40 |
| Asbestos fibers | 30–35 |
| Rubber/oil blend | 45–25 |

(References on following page)

References Cited

UNITED STATES PATENTS

| | | | |
|---|---|---|---|
| 3,239,478 | 3/1966 | Harlan | 260—33.6 AQ |
| 3,220,966 | 11/1965 | Flanagan | 260—28.5 A |
| 3,676,387 | 7/1972 | Lindlof | 260—33.6 AQ |
| 2,825,721 | 3/1958 | Hogan et al. | 260—96 R |

OTHER REFERENCES

Rubber World, Materials & Compounding Ingredients for Rubber (Bill Publication) (New York) (1968), p. 165.

Damusis: Sealants (Reinhold) (New York) (1967), p. 278.

Kirk-Othmer, Encyclopedia of Science & Tech. (2nd ed.) (vol. 2), (Interscience) (New York) (1963), p. 745.

MORRIS LIEBMAN, Primary Examiner

H. H. FLETCHER, Assistant Examiner

U.S. Cl. X.R.

260—33.6 A, 41.5 A, 876 B, 880 B